United States Patent
Butler et al.

(10) Patent No.: US 7,820,944 B2
(45) Date of Patent: Oct. 26, 2010

(54) SPECTROSCOPIC TECHNIQUE FOR MEASURING THE COMPOSITION OF CORED WIRE ELECTRODES

(75) Inventors: Kevin Butler, Broadview Heights, OH (US); Susan M. Femec, Munson, OH (US); Amy C. Russell, Columbus, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 974 days.

(21) Appl. No.: 11/430,213

(22) Filed: May 8, 2006

(65) Prior Publication Data

US 2007/0257014 A1 Nov. 8, 2007

(51) Int. Cl.
- B23K 35/02 (2006.01)
- B23K 35/22 (2006.01)
- G01N 1/00 (2006.01)
- G01J 3/30 (2006.01)

(52) U.S. Cl. .............................. 219/145.1; 219/145.22; 219/146.1; 356/36; 356/315; 73/866

(58) Field of Classification Search .............. 219/145.1, 219/145.22, 146.1; 356/36, 315, 316; 73/866
See application file for complete search history.

(56) References Cited

U.S. PATENT DOCUMENTS

| | | | |
|---|---|---|---|
| 4,104,113 A | 8/1978 | Sherman et al. | |
| 4,347,216 A * | 8/1982 | Kawasaki et al. | 422/78 |
| 4,613,738 A | 9/1986 | Saville | |
| 4,721,837 A * | 1/1988 | Gamberg | 219/69.1 |
| 4,736,083 A | 4/1988 | Saville | |
| 4,795,713 A | 1/1989 | Koop et al. | |
| 4,904,450 A | 2/1990 | Floyd | |
| 4,933,529 A | 6/1990 | Saville | |
| 5,204,065 A | 4/1993 | Floyd | |
| 5,215,715 A * | 6/1993 | Haswell et al. | 422/81 |
| 5,225,661 A | 7/1993 | Chai et al. | |
| 5,264,185 A | 11/1993 | Floyd | |
| 5,306,896 A | 4/1994 | Glater et al. | |
| 5,939,718 A | 8/1999 | Yamada et al. | |
| 5,948,307 A | 9/1999 | Stalling | |
| 6,002,129 A | 12/1999 | Ito et al. | |

(Continued)

FOREIGN PATENT DOCUMENTS

EP   0 522 828 A1   1/1993

(Continued)

OTHER PUBLICATIONS

PerkinElmerSCIEX Instruments, "ICP Mass Spectrometry, The 30-Minute Guide to ICP-MS", 2001 PerkinElmer, Inc., 8 pgs.

*Primary Examiner*—Tu B Hoang
*Assistant Examiner*—Ayub Maye
(74) *Attorney, Agent, or Firm*—Hahn Loeser & Parks, LLP

(57) ABSTRACT

Provided are procedures and arrangements for determining composition of cored welding wire electrodes. A portion of a length of a cored welding wire electrode is detached, to serve as a sample portion. The sample portion is provided to a digestion vessel, where it is digested into a sample solution. The sample solution is provided to an analytical device which analyzes the sample solution to determine the elements and concentrations of elements which comprise the sample solution.

20 Claims, 4 Drawing Sheets

U.S. PATENT DOCUMENTS

| | | |
|---|---|---|
| 6,146,768 A | 11/2000 | Masaie et al. |
| 6,265,717 B1 | 7/2001 | Sakata et al. |
| 6,841,246 B2 | 1/2005 | Shimizu et al. |
| 6,906,285 B2 | 6/2005 | Zucker et al. |
| 2006/0000818 A1 * | 1/2006 | Kim et al. ................ 219/146.1 |

FOREIGN PATENT DOCUMENTS

| | | |
|---|---|---|
| EP | 0 522 828 B1 | 9/1997 |

* cited by examiner

SPECTROSCOPIC TECHNIQUE FOR MEASURING THE COMPOSITION OF CORED WIRE ELECTRODES

BACKGROUND

The present application relates to consumable welding components such as cored welding wire electrodes, and more particularly to methods and arrangements for analyzing and determining the composition of cored welding wire electrodes, comprised of an outer metal jacket and an inner core of a filler material.

In the art of electric arc welding, it is common practice to use welding processes, wherein a cored welding wire electrode is advanced toward a workpiece, while an electric arc is created between the cored wire electrode, and the workpiece, for the purpose of melting the end of the wire electrode to deposit metal onto the workpiece. The composition of the wire electrode, the fluxing system, the type of electrical current, the shielding gas and other factors are adjusted to obtain the desired welding objectives. Such welding processes involve highly developed and sophisticated technology, including the precise composition of the wire electrode consumed in the welding process, where different compositions and/or characteristics of the filler and outer jacket are used for specific welding applications. By manipulating the composition and concentration of materials which comprise the filler as well as the type of metal jacket used, particular welding operations may be achieved.

More particularly, dependent upon the actual composition and other characteristics of the filler material and metal jacket, variables such as heat, voltage levels, speed, etc. may be adjusted to achieve in the desired welding output. Therefore, it is beneficial to know the composition and characteristics of the cored welding wire electrode.

One procedure is to infer the characteristics of the cored welding wire electrode from the known make-up, such as obtained from existing literature, of the raw materials used to manufacture the metal jacket, and the filler material. An alternative procedure is to perform actual analysis of the outer metal jacket and core filler material, separately, prior to forming the cored welding wire electrode. This can be accomplished using known analysis techniques. The results of the analysis are then used to estimate the characteristics of cored welding wire electrode. Still a further technique is to take a portion of a manufactured cored welding wire electrode, and separate the outer jacket and filler material, then the filler material and outer metal jacket are separately analyzed as in the prior procedure.

Each of the foregoing procedures suffer from inaccuracies, as related to the analytical techniques used and/or the assumptions made while performing the inferential or estimate-based calculations. Further, the foregoing procedures are performed on wire physically and temporally distant from the wire electrode being consumed in the welding process.

Therefore, it is considered desirable to provide new procedures and arrangements by which cored welding wire electrodes are directly and more accurately analyzed in order to determine their effect upon the welding process. It is also desirable for the analysis to take place, such that it is closely associated with the actual portions of the cored welding wire electrode being used in the welding process.

SUMMARY

Provided are procedures and arrangements for determining composition of cored welding wire electrodes. A portion of a length of a cored welding wire electrode is detached, to serve as a sample portion. The sample portion is provided to a digestion vessel, where it is digested into a sample solution. The sample solution is provided to an analytical device which analyzes the sample solution to determine the elements and concentrations of elements which comprise the sample solution.

DETAILED DISCLOSURE

Figure 1:
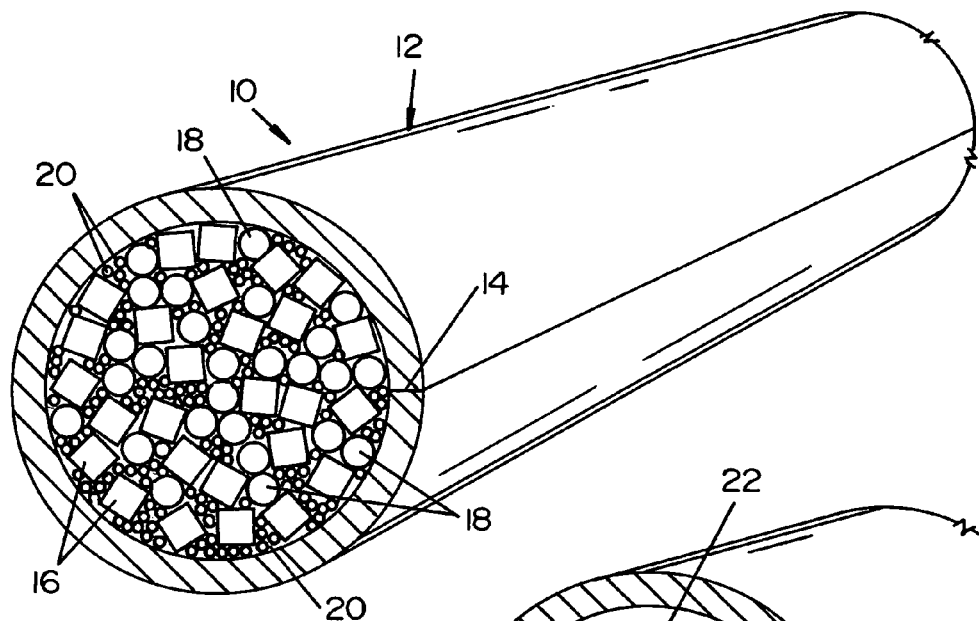
FIG. 1 is a schematic cross-sectional view of a cored welding wire electrode which may be employed within the concepts of the present application.

Referring now to the drawings, illustrated in FIG. 1 is a basic cored welding wire electrode 10, consisting of outer metal jacket 12 joined together at seam 14. The seam of outer metal jacket 12 may be overlapping or otherwise formed in accordance with standard practice for making a cored welding wire electrode 10. Within metal jacket 12 is a compacted core formed from filler material particles 16-20, represented as squares, large circles and small circles. It is to be appreciated particles 16-20 are intended to represent any of a variety of chemical, metal or other components used as filler.

In one instance, the core comprised of particles 16-20, is compacted by drawing outer jacket 12 to a diameter smaller than its initial size. It is to be appreciated, however, other procedures of compacting filler particles 16-20 may also be employed, such as having a stamper or other mechanism pushing the core filler material particles 16-20 into a compact form. It is also to be appreciated, while the section of cored welding wire electrode 10 of FIG. 1 is depicted as straight, such wire electrodes may be formed as coils.

Figure 2:
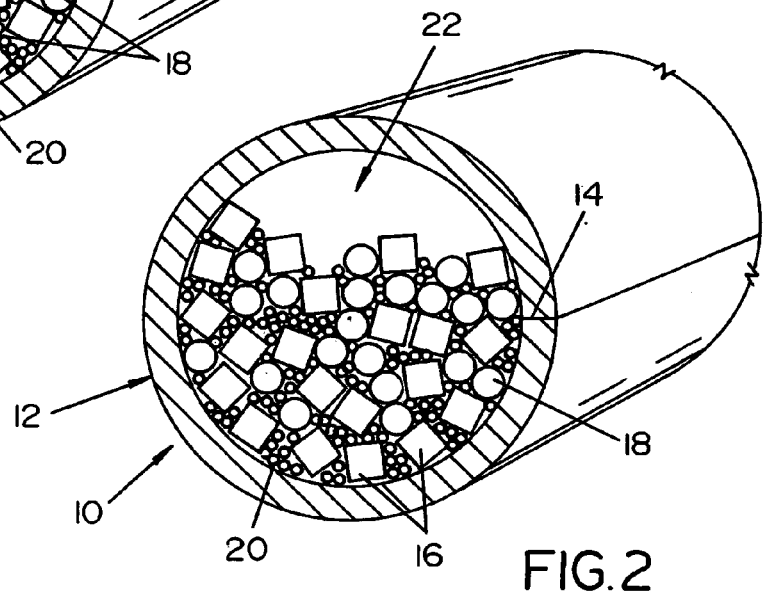
FIG. 2 is a schematic cross-sectional view of a cored welding wire electrode having a void area.
Figure 3:
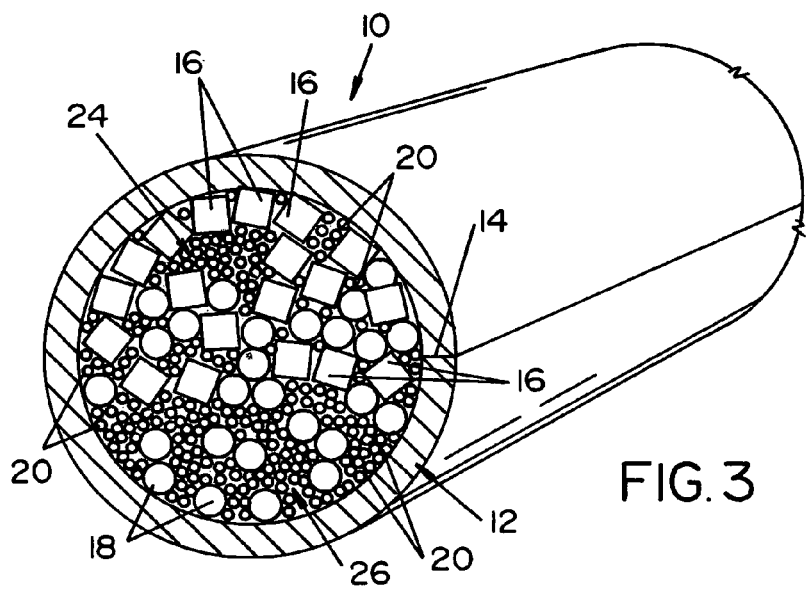
FIG. 3 is a cored welding wire electrode having variations in fill areas.

The drawing of FIG. 1 illustrates an idealized version of the distribution of filler particles 16-20. More particularly, there is a substantially even distribution of the particles throughout the core. On the other hand, as shown in FIG. 2, it is possible when compacting of the particles is taking place, a void 22 may be formed where a portion of the core has no particles. Alternatively, as shown in FIG. 3, rather than the even distribution of the filler material, it is possible that some cored wire electrodes will have variations in the filler material. For example, a lower concentration of particular particles, such as particles 16 and 18, may be found in lower concentrations in certain areas, such as areas 24 and 26. These voids and non-uniform concentrations can affect the welding process since other welding parameters (e.g., heat, speed, voltage, etc.) are determined at least in part based on an assumption the cored wire electrode has certain characteristics.

As mentioned, the prior procedures of determining the composition of a cored welding wire electrode allow for an undesirably high level of inaccuracy. For example, inferring the composition of the filler material and metal jacket from the published literature does not involve any actual testing of the materials. Therefore, during the manufacturing process, if the mix of particles in the filler material composition are altered, these variations will not be taken into account. Additionally, if the filler material is tested separately, there is the possibility that the filler material composition may change by addition or subtraction of materials, particles, components or contaminants from the time it is tested until the time it is placed within the inner area of the metal jacket. Still further, none of the processes can take into account the variations due to the issues related to FIGS. 2 and 3, where there may be voids or distribution variations in the materials within the metal jacket.

Since the existing procedures do not test or analyze a portion of the cored welding wire electrode at a location near to the portion of the wire electrode being consumed, the existing procedures do not permit precise and timely information regarding the composition of the cored welding wire electrode substantially immediately adjacent to portions of the cored welding wire electrode being consumed.

Figure 4:
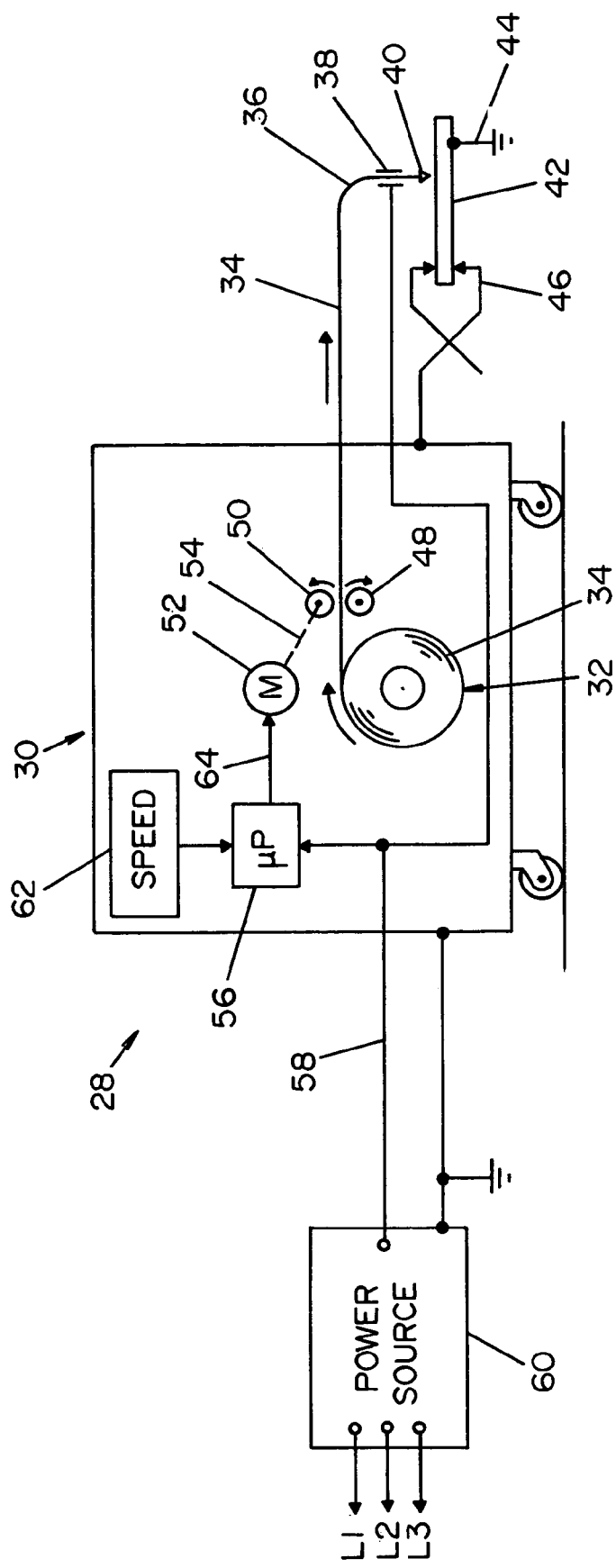
FIG. 4 is a schematic view of a welding system, including a wire feeding arrangement.

On the other hand, the present application provides the capability of accurately analyzing the cored welding wire electrode at a location very near and/or immediately adjacent the portion of the cored welding wire electrode 10 being consumed. For example, and turning more particularly to the present concepts, illustrated in FIG. 4 is a simplified block diagram of an electric arc welder system 28. In accordance with normal practice for one particular type of welding procedure, provided is a remotely located wire feeder 30 of the type including an internal spool 32 which holds a welding wire 34, such as cored welding wire electrode 10 of FIG. 1 formed in a coil. The welding wire 34 is pulled from spool 32 and pushed through a gun or torch 36 to a contact sleeve 38. Electric power is directed to electrode 40, which is a portion of wire 34, for performing an electric arc welding process between electrode 40 and a workpiece 42. Standard ground 44 is connected to the wire feeder through ground clamp 46. In accordance with standard technology, feeder 30 includes feed rolls 48, 50, driven by a motor 52 through shaft 54. Speed is controlled by a microprocessor or other controller 56 that receives power from input power cable 58 connected to an adjustable power source 60, which can deliver adjustable voltages for the arc welder system 28. The feed speed is determined by the speed of motor 52 and is adjusted by speed control 62. Output 64 has a voltage to determine the desired speed of motor 52 for the proper wire feed speed of wire 34. The speed is used to control the arc current, and the speed may be controlled by a plurality of processes known in the art such as described in U.S. Pat. No. 6,906,285 to Zucker et al, assigned to the same assignee as the present application, and hereby incorporated by reference in its entirety.

As can be seen by FIG. 4, as electrode 40 is consumed, and wire 34 is continued to be fed, the coiled welding wire 34 on spool 32 continues to be payed out.

Using the concepts of the present application, a direct accurate analysis of the cored welding wire electrode (32, 40) is obtained. It is to be appreciated the discussion with FIG. 4 is only shown as one example of a welding system, and other welding system arrangements may also take advantage of the presently described concepts.

Figure 5:
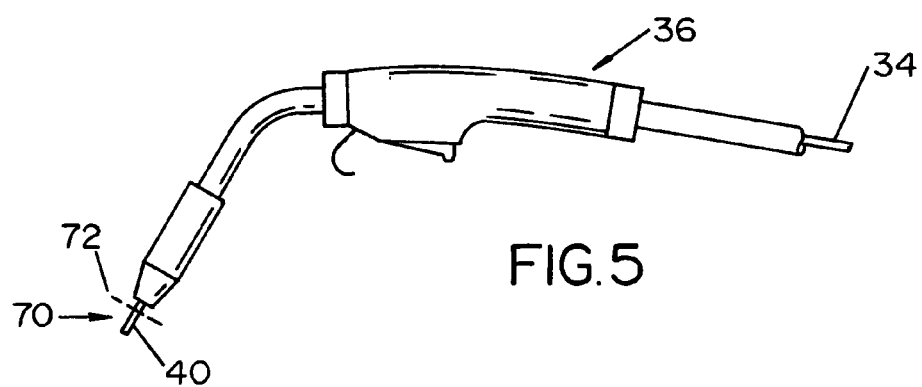
FIG. 5 is an enlarged view of the welding gun of FIG. 4.

Turning to FIG. 5, an enlarged, more detailed view of welding gun 36 is illustrated with electrode stickout 40 extending out of the gun 36, as welding wire 34 is moved into and through gun 36. In one embodiment, once the welding process stops, or in alternative situation, prior to the welding operation starting for the specific electrode 34 being used, a portion of electrode 40, identified as sample portion 70 is detached at detachment area 72. The detaching may be undertaken by any known detaching device, such as a welding knife, saw, cutter or other appropriate detachment device. The detached sample portion 70 maintains the relational integrity of the outer jacket and core material. In one example, the sample portion may be 0.25" in length and 0.100" in diameter, although other sizes may also be used. The sample portion may be weighed and the weight recorded for later use. Thus, in this procedure, the outer metal jacket 12 is not opened or otherwise removed from its relationship to the core material.

Figure 6:
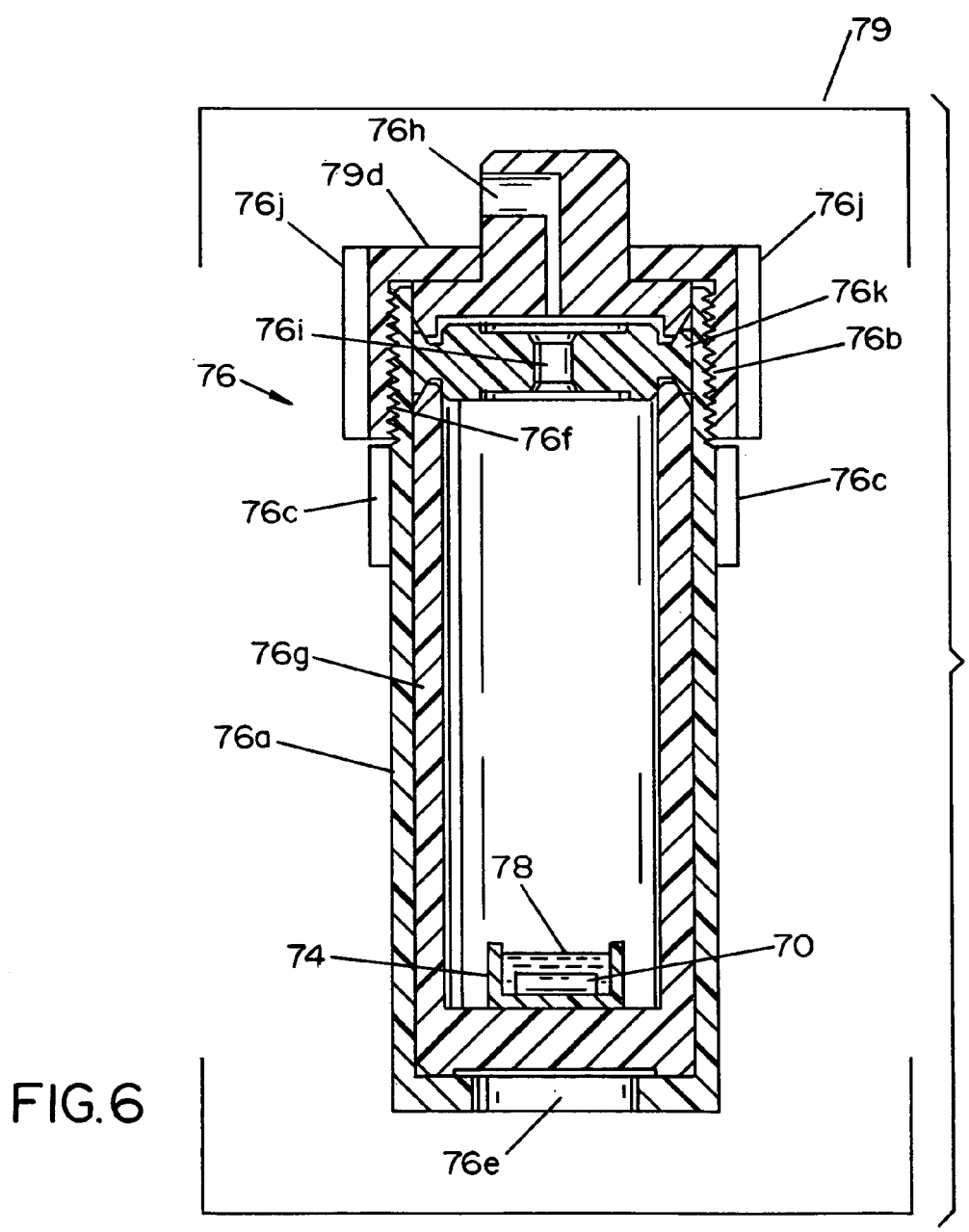
FIG. 6 is a microwave closed digestion vessel used in accordance with the present application.

Then, as shown in FIG. 6, sample portion 70 is placed in a carrier 74 and provided to a digestion vessel 76. The digestion vessel is a high-pressure and high-temperature closed microwave digestion vessel. A number of closed microwave digestion vessels are known in the art and may be used in connection with the present concepts. Particular vessels are described in more detail, for example, in U.S. Pat. Nos. 4,613,738 and 4,736,083 to Saville, each hereby incorporated in their entirety by reference. The digestion vessel 76 of FIG. 6, has a cylindrical outer casement 76a, which in one embodiment may be molded of a microware transparent material, such as polyetherimide resins. Threads 76b are provided in a top edge of the casement 76a, as are gripping lugs 76c for connection with a cap or cover 76d also provided with gripping lugs 70n. Casement 76a includes an access opening 76e. Threads 76f of the cap or cover 76d engage the threads 76b of the outer casement 76a so that the cap 76d may be threaded onto the casement 76a to a desired tightness. The vessel also includes a cylindrical inner container 76g molded of a chemically inert material, which is also resistant to degradation under high temperature and pressure. In one embodiment, the material may be for example a PFA Teflon. Container 76g is sized to fit in close surface contact to the outer casement 76a, but not so close that sliding contact is prevented. Outer casement 76a provides support to the sidewalls of container 76g when under pressure. The casement cap 76d is provided with a pressure relief vent 76h, coaxial with a pressure vent 76i in a reversible container cap 76k, for exiting vapor or liquid.

A digestion medium or decomposition reagent, such as acid 78 is also included within vessel 76 to assist in the digestion of sample portion 70. A variety of decomposition reagents and combinations thereof may be employed to assist in the digestion of the sample portion 70. Commonly used decomposition reagents include nitric acid, hydrochloric acid, hydrofluoric acid, sulfuric acid perchloric acid and hydrogen peroxide. All of these reagents may be used alone or in combination in their concentrated form, or in a more dilute state achieved by adding a diluent (i.e., water).

It is known that nitric acid is an oxidizing acid that will dissolve most metals to form soluble metal nitrates. It is a powerful oxidizing acid in concentrated form, and its oxidizing strength can be enhanced by the addition of chlorate, permanganate, hydrogen peroxide or bromine, or by increasing the temperature and pressure of the digestion vessel.

Hydrochloric acid is often combined with nitric acid, and when the mixture is a 3 to 1 ratio of hydrochloric acid to nitric acid, it is known as aqua regia.

While these chemical reactives are commonly used, it is to be understood they are not the only acids which may be appropriate.

Once the appropriate digestion solution is provided to the digestion vessel, the vessel is placed in a microwave generating heater device 79, which is then operated to dissolve the sample portion 70.

The microwave 79 may generate temperatures of 200° C. or more, and the dissolving period will be dependent on the amount of material to be digested. The time for the operation of the microwave digestion vessel is, again, dependent upon the size and volume of the sample material. However, anywhere from 5 to 45 minutes is a reasonable expectation.

It is also to be noted that should the sample not be completely digested, a process to further the present concepts is to collect and fuse the partially digested sample portion and then undertake additional dissolving of the fused material using a digesting mixture, either within the digestion vessel or separately.

It is noted the present arrangements and processes prefer the use of a closed digestion vessel system. Particularly, the temperatures required for the digestion to be efficiently completed would cause an atmospheric digestion system (i.e., open to the atmosphere) to reach boiling temperatures prior to digestion of the sample. Therefore, a closed digestion vessel is preferred.

Figure 7:
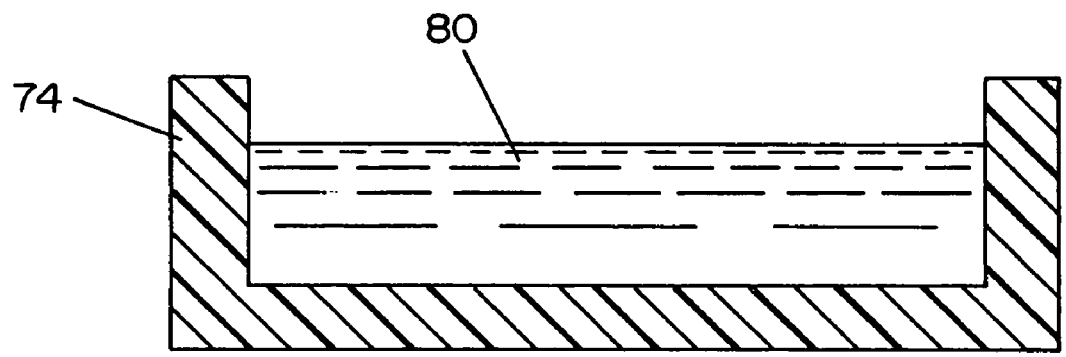
FIG. 7 is a sample solution generated by the digestion vessel of FIG. 6.
Figure 8:
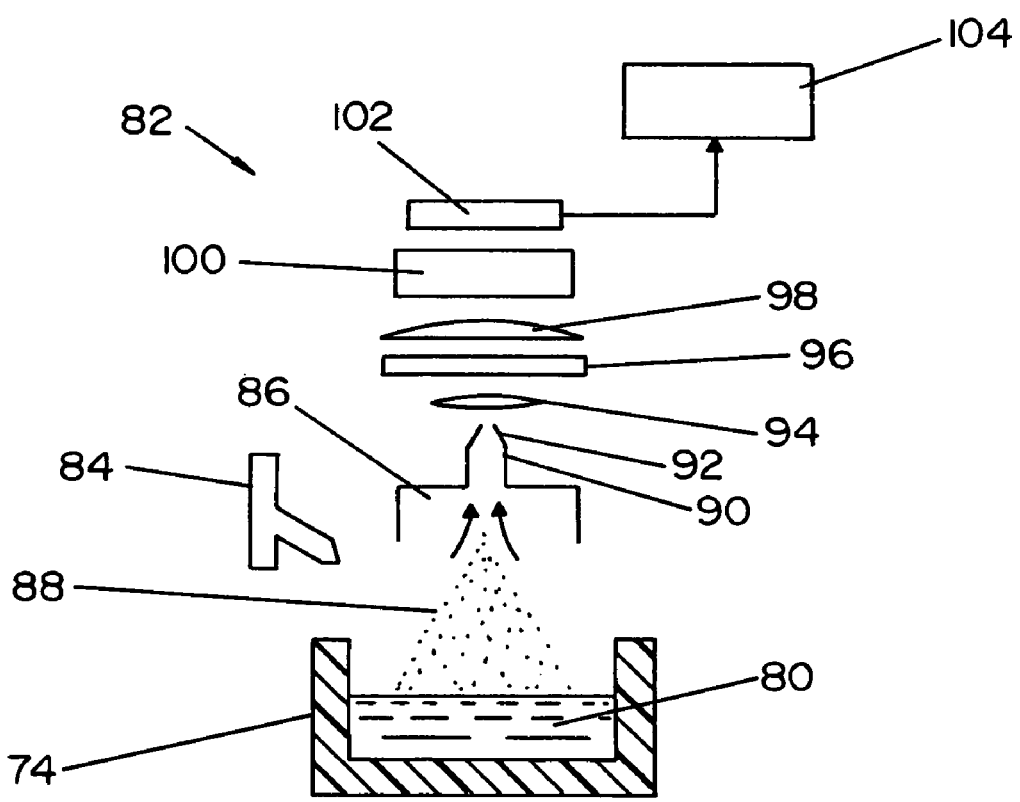
FIG. 8 illustrates an analytical device used within the concepts of the present application.

Once the sample portion has been fully digested, it is now in the form of a sample solution 80, as shown for example in FIG. 7. This sample solution is then provided to an analytical device 82 as shown in FIG. 8, which may be one of a variety of devices capable of analyzing the content of a substance such as a sample substance 80. More particularly, the analytical device may be one which employs a spectrometric technique such as Inductively Coupled Plasma Mass Spectrometry (ICP-MS), Inductively Coupled Plasma Optical Emission Spectrometry (ICP-OE), various types of Flame Spectroscopy, such as Atomic Absorption Spectroscopy (AA) and Atomic Emission Spectroscopy (AES), among others.

As mentioned, the analytical device 82 may, in one embodiment, be an ICP-MS device. In such a system, the most common element samples analyzed are liquids, e.g., sample solution 80. However, solid samples can be analyzed using lasers or heated cells to vaporize the sample. Gas samples can be measured by direct introduction into the instrument. Shown in FIG. 8, is the most common sample introduction system used on an ICP-MS, which consists of a nebulizer 84 and spray chamber 86. The nebulizer 84 converts the liquid samples 80 into very small droplets 88. These droplets are carried through spray chamber 86 and into tube or injector 90 that is the center channel of torch 92, and then into plasma 94. The plasma ionizes the elements present in the droplets. These ions then pass through interface 96 and ion lens 98. After being focused by ion lens 98, the ions are separated by their mass-to-charge ratio in mass spectrometer 100 and measured by detector 102. Once detector 102 measures the ions, computerized data system 104 is used to convert the measured signal intensities into concentrations of each element and to generate a report of the results. U.S. Pat. Nos. 6,265,717 to Sakata et al., 6,002,129 to Ito et al, and 5,939,718 to Yomoda et al., further describe ICP-MS devices and methods, and each of these patents are hereby fully incorporated by reference.

Prior to providing the sample solution to analytical device 82, sample solution 80 may be diluted by use of a diluting substance having known characteristics, and of a known amount. For example, in one situation, the diluting substance might be water, where the sample substance is 1 oz. and the diluting substance is 3 oz. Therefore, the diluted sample substance provided to analytical device will have a total volume of 4 oz.

Operation of the analytical device 80, will then determine the composition of the sample solution and a concentration of elements within the solution. Using this information, it is possible to calculate the percent the materials in the original detached sample portion.

For example, if the sample portion weighs 1 oz., and is digested into a sample solution which is diluted with 3 oz. of diluting material, the diluted sample solution weighs a total of 4 oz. If it is then determined by the analytical device that the percent of a particular material element in the diluted sample solution is 6.25% of the overall diluted sample solution, then it could be calculated that 25% of the original sample portion is comprised of that material.

A primary implementation of the foregoing technique is to aid in understanding the variations inherent in cored wire manufacturing processes, to check the quality of manufactured wire electrode, and to provide a better understanding of how materials in the wire electrode affect the welding process.

A particular use is illustrated by the following example. Particularly, cored wire electrodes are known to be used in a variety of welding applications. As such, they use a variety of fillers or powders depending on the needs of the particular application. The recovery of certain metals in the weld deposit is of particular importance in many applications. In a particular welding application, the recovery of nickel in the weld metal from the electrode filler may be of interest. With this in mind, a design engineer sets out to correlate the amount of nickel in the weld deposit to the amount of nickel in the cored wire electrode. Classical thinking leads the engineer to calculate the amount of nickel in the electrode (fill and jacket) based on the expected amount in the raw materials. Unfortunately, this approach does not account for variability seen in the weld deposits across an entire manufacturing run. Therefore, in an alternative procedure again using classical approaches, the wire and jacket are separated and analyzed, but the results are unclear, as the variation in the test is greater than the variation in the weld deposits. The engineer then turns to the presently described techniques, which allow for the analysis of the wire that was manufactured within seconds of the wire used to create the weld deposit. These new techniques show variations in the nickel content of the wire, either due to manufacturing irregularities, such as variance in the fill powder mixture, composition of the outer metal jacket, or to the existence of segregation or voids in the core. The determined nickel content of the sample portion of the wire electrode now corresponds closely with the nickel in the weld deposit, and the engineer can set out to eliminate the manufacturing variations in nickel in the cored wire electrode. Without using the presently described technique, much time and money could have been lost exploring alternate theories.

Thus, the above arrangements and procedures permit for an accurate and reliable way to analyze portions of cored wire electrodes close to the portions of the cored wire electrodes being consumed in the welding process. The sample preparation time is cut significantly, and errors related to contamination, powder recovery, and digestion are minimized.

While the foregoing has described embodiments of the present application and illustrated those embodiments described herein, it will be appreciated that other embodiments can be made and that changes can be made in the described embodiments without departing from the principles described therein. Accordingly, it is to be distinctly understood that the foregoing descriptive matter is to be interpreted merely as illustrative of the presented concepts and not as limitations thereto.

The invention claimed is:

1. A method for determining a composition of a cored welding wire electrode positioned within a welding device, wherein welding operations are occurring which consume portions of the cored wire electrode, the method comprising:

stopping the welding operations;

detaching a sample portion of the cored wire electrode which has not been consumed in the welding process;

providing the sample portion to a closed system microwave digestion vessel;

digesting the sample portion in the digestion vessel into a sample solution;

providing the sample solution to an analytical device; and analyzing the sample solution with the analytical device, wherein elements and concentrations of the elements comprising the sample solution are determined.

2. The method according to claim 1, wherein the sample portion of the cored wire electrode is a portion of the cored wire electrode manufactured within seconds of the portion of the cored wire electrode consumed in the welding process.

3. The method according to claim 1, wherein the cored wire electrode is comprised of a filler material located within an outer metal jacket.

4. The method according to claim 3, wherein the filler includes metal particles.

5. The method according to claim 3, wherein the digesting step includes digesting the outer metal jacket and the filler material.

6. The method according to claim 1, wherein the digesting step includes, fusing of a partially digested sample portion into a fused material; and dissolving the fused material in an acid mixture.

7. The method according to claim 1, further including adding a dilute solution prior to providing the sample solution to the analytical device.

8. The method according to claim 1, wherein the analyzing step employs a spectrographic technique.

9. The method according to claim 1, further including detaching the sample portion prior to a start of an initial welding process using the cored wire electrode.

10. The method according to claim 1, wherein the analyzing step provides a direct measurement of the composition of the sample portion.

11. The method according to claim 3, wherein the sample portion provided to the digestion vessel is maintained with the filler material within the outer metal jacket.

12. A cored welding wire electrode composition detection arrangement comprising:

a welding device configured to hold a cored welding wire electrode;

a detachment device configured to detach a sample portion of the cored welding wire electrode while the cored welding wire electrode is held by the welding device;

a digestion vessel configured to receive the sample portion and to digest the sample portion to a sample solution; and an analytical analysis device configured to receive the sample solution and analyze the sample solution to determine elements and concentration of elements which comprise the sample solution.

13. The arrangement according to claim 12, wherein the sample portion of the cored wire electrode is a portion of the cored wire electrode manufactured within seconds of the portion of the cored wire electrode consumed in the welding process.

14. The arrangement according to claim 12, wherein the analytical device is a spectrometer device.

15. The arrangement according to claim 12, wherein the digestion vessel is a microwave closed digestion vessel.

16. The arrangement according to claim 12, wherein the sample portion is a portion of an outer metal jacket with a core comprised of a filler material within the metal jacket.

17. A method for determining a composition of a cored welding wire electrode comprising:

detaching a sample portion from a length of the cored wire electrode, the sample portion including a portion of an outer metal jacket and a core located within the outer metal jacket, the core comprised of a filler material;

placing the sample portion within a decomposition mixture;

providing the sample portion within the decomposition mixture to a digestion vessel;

digesting the sample portion in the digestion vessel into a sample solution;

providing the sample solution to an analytical device; and analyzing the sample solution with the analytical device, wherein elements and concentrations of the elements comprising the sample solution are determined.

18. The method according to claim 17, wherein the sample portion of the cored wire electrode is a portion of the cored wire electrode manufactured within seconds of the portion of the cored wire electrode consumed in the welding process.

19. The method according to claim 17, wherein the cored wire electrode is comprised of a filler located within an outer metal jacket.

20. The method according to claim 17, wherein the analyzing step provides a direct measurement of the composition of the sample portion.

* * * * *